Figure 1:
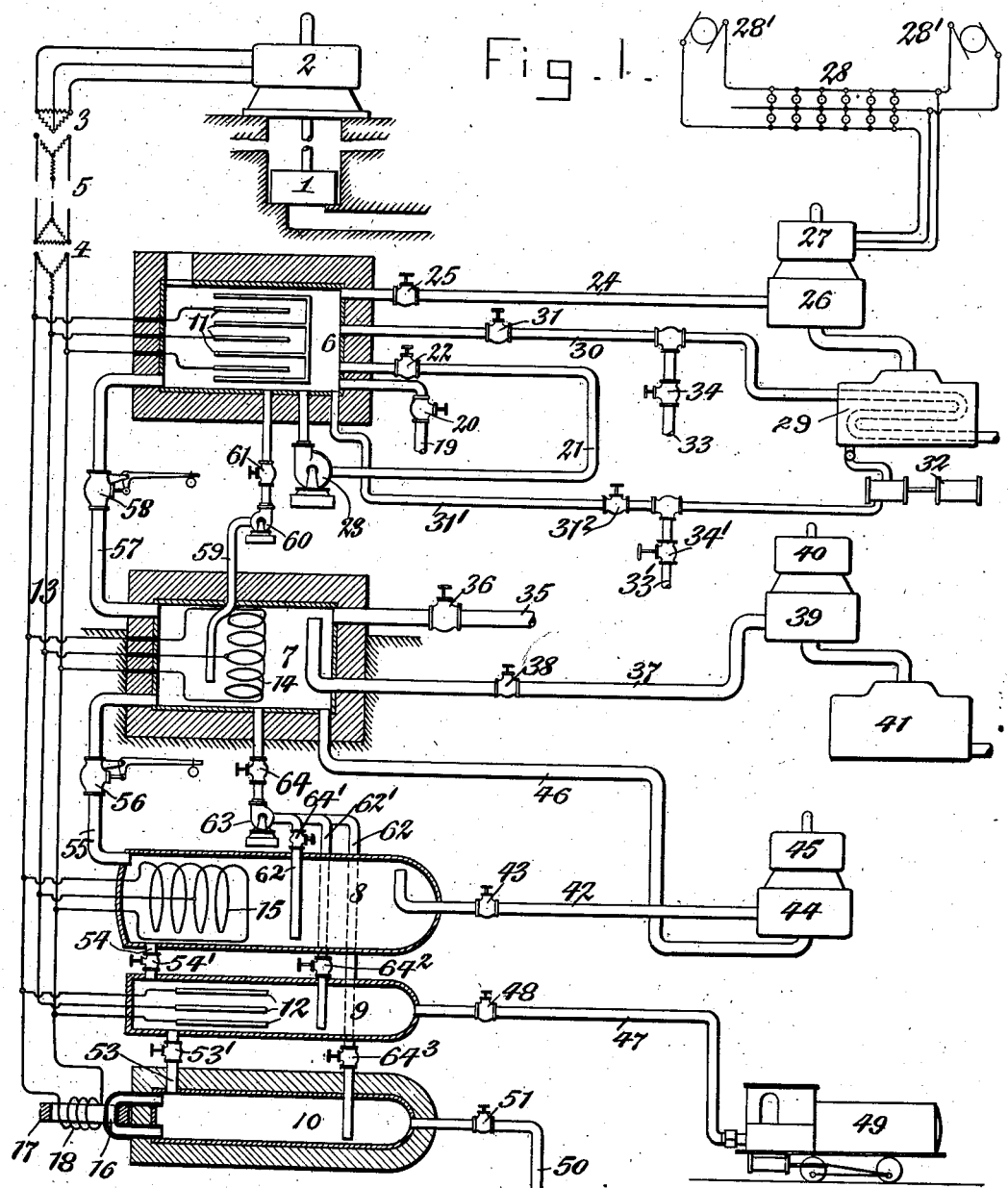

F. C. PERKINS.
HYDRO-ELECTRIC STORING AND DISTRIBUTING SYSTEM.
APPLICATION FILED MAY 18, 1912.

1,145,508.

Patented July 6, 1915.
2 SHEETS—SHEET 1.

WITNESSES
M. Ray Taylor
Leroy S. Hodges

INVENTOR
Frank C. Perkins
by Geyer & Popp
ATTORNEYS

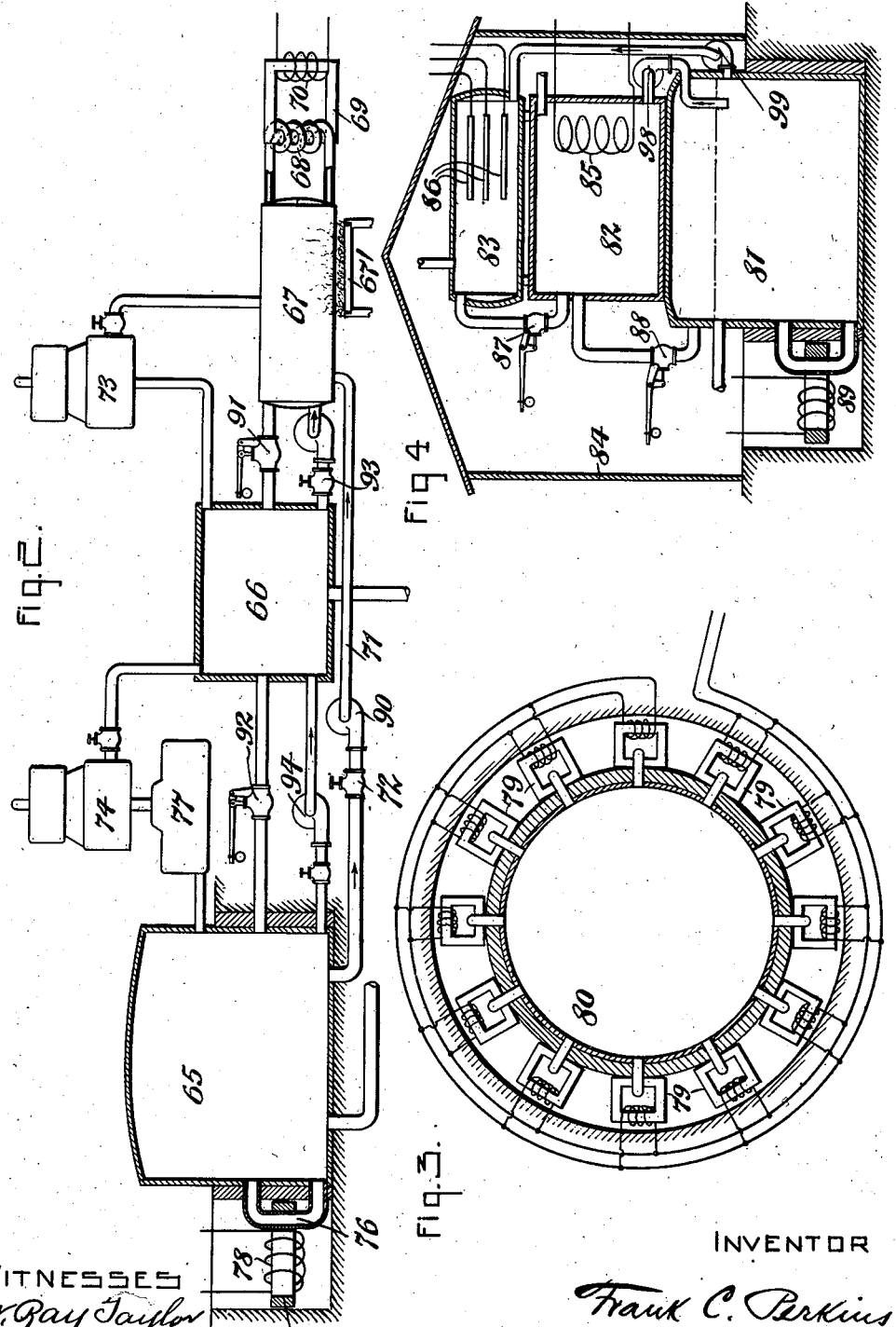

UNITED STATES PATENT OFFICE.

FRANK C. PERKINS, OF BUFFALO, NEW YORK, ASSIGNOR OF ONE-HALF TO LEWIS STOCKTON, OF BUFFALO, NEW YORK.

HYDRO-ELECTRIC STORING AND DISTRIBUTING SYSTEM.

1,145,508.  Specification of Letters Patent.  Patented July 6, 1915.

Application filed May 18, 1912. Serial No. 698,246.

*To all whom it may concern:*

Be it known that I, FRANK C. PERKINS, a citizen of the United States, residing at Buffalo, in the county of Erie and State of New York, have invented new and useful Improvements in Hydro-Electric Storing and Distributing Systems, of which the following is a specification.

This invention relates to a hydro-electric storing and distributing system for heating, lighting and power purposes.

It is the object of this invention to provide means whereby the energy of a water fall may be economically converted into electric energy at night or at such hours of the day when there is a minimum consumption of power and then changed into heat energy and stored in water heat storage tanks for use during the day time or at such other times when the maximum demand occurs, for heating, or reconverted into electricity for lighting or power service.

It is well known that large quantities of electric power cannot be cheaply and economically stored in electric storage batteries owing to the excessive loss due to inefficiency of the electro-chemical system, excessive first cost battery and installation, and the heavy cost of maintenance and depreciation.

My invention takes advantage of the immense heat absorbing and storage power of water which is well known to be greater than that of any other substance per cubic foot. Hot water raised to a temperature of 212° F. stores in it heat energy equivalent to raising the weight of the water several thousand feet, which may be given up in the form of power by a low pressure steam turbine and condenser at extremely high efficiency. For instance, sufficient energy could be taken from a water fall at night and stored in the form of heat in water to supply heat, or be converted into electric light and power and distributed to the surrounding locality.

By this hydro-electric heat storage system, low pressure steam turbo-electric generating units of, say, 10,000 kilowatts capacity can be used without difficulty to reproduce electric current from the heat storage water tanks.

The water power electric plants are usually called upon for very little power from midnight, when the lighting load and railroad load drops off, until morning when the railroad and power loads come on again. This hydro-electric heat storage and distributing system would therefore save the energy of the water power during light load which cannot be utilized economically by any other storage system and would utilize this energy for taking care of the peak of the load, thereby avoiding waste of power and utilizing such power to the best advantage.

In carrying this hydro-electric heat storing and distributing system into effect, a steam turbine is preferably utilized in its organization because the same constitutes an ideal power generator from low pressure steam. A high vacuum condenser is also preferably employed in connection with the low pressure steam turbine for the purpose of reducing the boiling point of the water to less than half the number of degrees required at atmospheric pressure, so that hot water at 212° F. or higher if the tank is under high pressure, gives up steam for heating systems or power for turbo-electric generators.

In the accompanying drawings consisting of 2 sheets: Figure 1 is a diagrammatic representation of one embodiment of my invention. Fig. 2 is a fragmentary sectional elevation showing another embodiment of parts of my invention. Fig. 3 is a horizontal section showing a storage tank for heated water equipped with electric heating means different from those shown in Figs. 1 and 2. Fig. 4 is a vertical section showing another way of arranging the hot water storage tanks in accordance with my invention.

Similar characters of reference indicate corresponding parts throughout the several views.

Referring to Fig. 1, 1 represents a hydraulic motor which is driven by the energy of water in motion. As shown in this figure the water motor is of the well known turbine type and adapted to be driven by falling water. 2 represents a main electric generator which may be connected directly with the water turbine, as shown in Fig. 1, or in any other suitable way. 3 represents a step-up transformer which is electrically connected with the generator at the hydraulic power plant, 4 a step-down transformer located at the heat storage and distributing plant, and 5 the lines whereby the electric current is transmitted from the step-up to the step-down transformer.

At the heat storage and distributing plant, means are provided for heating water by the electric current received from the main generator 2 through the medium of the transformers and transmission line and for utilizing the heat in various ways for heating, or after reconversion into electricity for lighting or power purposes. The means for heating the water by the electric current may be varied and the pressure at which the heated water is stored may also be varied. In Fig. 1 of the drawings is shown a boiler or tank 6 which is adapted to hold water at a temperature of 200° F. and at atmospheric pressure, another boiler or tank 7 is adapted to hold water at 212° F. or over and under 10–15 lbs. pressure, and a battery of three boilers or tanks 8, 9, 10 adapted to hold water at about 20 lbs. and 250° F. 50 lbs. to 100 lbs. pressure and about 400° F. or 100 to 300 or more lbs. pressure and 400° F. or more.

The water in the tanks 6 and 9 is heated by means of plates 11, 12 arranged respectively within these tanks, similar to plate water rheostats and connected with the service line 13 of the step-down transformer, the water in the tanks 7 and 8 is heated by coils 14, 15, arranged respectively, in the tanks and connected with the service line, while the water in tank 10 is heated by hydro-electric transformer comprising an upright metal heating pipe or leg 16 connected at the upper and lower ends with the upper and lower parts of the tank and forming the secondary of a transformer, a laminated or transformer core ring 17 of iron passing with one side around the heating pipe and forming the core of the transformer, and a coil of insulating wire 18 wound around a part of said core and connected with the service line and forming the primary of the transformer. The water in the tanks 6 and 9 is heated by the passage of the electric current between the companion terminal plates of the heaters 11, 12, in tanks 7, 8, the water is heated by the rise in temperature of the coils 14, 15 as the electric current passes through the same, and in tank 10 the water is heated in the pipe and caused to circulate in this tank by the heating of the pipe 16 by induction as the current traverses the coil 18.

The hot water in the lower part of the tank 6 may be withdrawn from the lower part thereof by a pipe 19 containing a valve 20 for thermo-chemical, electro-chemical or manufacturing purposes, or the same may be circulated by a pipe 21 containing a valve 22 and a pump 23 for carrying the heated water to and from any place to be heated. The steam in the upper part of the tank 6 may be conducted by a pipe 24 containing a valve 25 for power purposes to a low pressure steam turbine 26. The latter may operate an electric generator 27 which may be directly connected therewith and the current from this generator may be utilized for supplying electric lights 28, electric motors 28¹ or other purposes. The exhaust steam from the turbine 26 may be conducted from the latter to a condenser 29 and the water of condensation may be carried from this condenser back to the lower part of the tank 6 by a return pipe 31 containing a valve 31¹ or may be delivered elsewhere through a branch pipe 33¹ containing a valve 34¹. The effect of this condenser is to create a vacuum therein, this being effected for instance by a vacuum pump 32 connected with the condenser, as shown, or in any other suitable manner. If desired, the heated circulating water of the condenser may be withdrawn from the return pipe 30 by a branch pipe 33 containing a valve 34 for industrial or other purposes or connected with waste.

Owing to the greater pressure in the tank 7 the steam in the same may be used in a low pressure steam heating system for which purpose this tank may be provided with a service pipe 35 containing a valve 36. Steam may also be withdrawn from this tank by a pipe 37 containing a valve 38 and conducted to a steam turbine 39 which operates an electric generator 40. A condenser 41 may also be associated with the last mentioned turbine engine for the purpose of increasing the efficiency of the same.

From the tank 8 steam may be supplied by a pipe 42 containing a valve 43 to a high pressure steam turbine 44 which operates an electric generator 45 or other machine and which discharges its exhaust through a pipe 46 into the tank 7 of lower internal pressure so that the heat units still remaining in the exhaust water will be saved.

The water in the tanks 9 and 10 is superheated and the same may therefore be used to advantage for operating what are known as fireless motors. For instance, superheated water may be supplied from the tank 9 by a pipe 47 containing a valve 48 to the container 49 of the motor of a fireless locomotive and superheated water may be supplied from the tank 10 by a pipe 50 containing a valve 51 to the container 52 of a motor of a fireless boat.

The tanks 8, 9 and 10 may be permanently connected with each other by pipes 53, 54 so as to form practically one boiler space in case some high pressure is used in all, but must be separated by valves 53¹, 54¹ in the pipes 53, 54, if it is desired to use these boilers independently.

If the pressure in the tanks 8, 9 and 10 should exceed a predetermined limit the same may blow-off through a pipe 55 connected at its inlet end with the tank 8 and provided with a safety valve 56. In order to avoid wasting the steam and water which escapes at this time from the tanks 8, 9 and 10, the outlet end of the pipe 55 is connected with the tank 7 which is of lower internal pressure and therefore capable of receiving the excess pressure from the tanks 8, 9 and 10.

If desired, this invention may be combined with an ordinary fuel heated boiler as an auxiliary to the latter, such an application being shown in Fig. 2 in which the boiler 67 may be provided with a furnace $67^1$ of well known form for heating the water in this boiler. In this organization the electric water heating device 68, 69, 70 supplements the effect of the ordinary furnace heater $67^1$. In like manner the tank 7 is connected with the tank 6 by a pipe 57 containing a safety valve 58 which opens from the tank 7 to the tank 6, thereby enabling any excess pressure in the tank 7 to escape to the tank 6 which is of lower internal pressure and thereby effecting a saving in heat units. If the tank 7 requires feed water the same may be charged from the tank 6 by a pipe 59 which connects these tanks and which contains a pump 60 and a valve 61. In like manner the tanks 8, 9 and 10 when requiring water may be fed from the tank 7 by pipes 62, $62^1$, $62^2$ connecting the tank 7 with the tanks 8, 9 and 10 and containing a pump 63 and valves 64, $64^1$, $64^2$, $64^3$.

In Fig. 2 three tanks 65, 66 and 67 are connected with each other in substantially the same manner as tanks 6, 7 and 8, said tanks 65, 66 and 67 being adapted to hold hot water at atmospheric pressure, 15 lbs. pressure and 150 lbs. pressure, respectively, also tank 66 may be fed with the necessary water from atmospheric pressure tank 65 by pipe and pump 94 or water may be pumped from tank 66 to tank 67 by pump and pipe 93. The water in the tank 67 is heated by a transformer having a water leg 68 which forms the secondary and makes several turns around the core 69 of this transformer of which 70 is the primary instead of but a single turn around the core, as shown in Fig. 1. Furthermore, in this construction the high pressure tank 67 may be supplied with feed water from the atmospheric pressure tank 65 by a pipe 71 connecting these tanks and containing a valve 72 and pump 90. In this construction a high pressure steam turbine 73 is represented as taking steam from the tank 67 and exhausting into the tank 66, and a low pressure steam turbine 74 is taking steam from the tank 66 and exhausting into a condenser 77 which latter in turn discharges into the tank 65.

If desired, the water in the low pressure tank 65 may be heated by a transformer comprising a metal water leg 76 communicating at its upper and lower ends with the interior of this tank, an iron core 75 which is embraced by the leg 76 forming the secondary and also by a coil 78 forming the primary of the transformer, as shown in Fig. 2.

Hot water may be carried from either of the tanks 65, 66 for heating or other purposes.

In Fig. 3 a plurality of water heating electric transformers 79, similar to those associated with the tanks 10, 65 and 67 are arranged in an annular row and connected with a cylindrical tank 80 for heating the water therein.

Excess pressure in the tank 67 may blow off through a safety valve 91 into the tank 66 and from the latter into the tank 65 through a safety valve 92. Feed water may also be delivered from the tank 66 into the tank 67 by a pump 93 and from the tank 65 into the tank 66 by a pump 94.

Fig. 4 shows a tier of tanks 81, 82, 83 arranged one above the other for compactness in a building or inclosure 84, said tanks being adapted to hold water at atmospheric pressure 15 lbs. pressure, and 150 lbs. pressure or more, respectively. The atmospheric tank 81 in this instance is provided with an electrical transformer water heater 89 and pumps 98, 99 are provided for delivering water from the tank 81 into the tank 82 and 83. Excess pressure in the tank 83 is permitted to blow off into the tank 82 by a safety valve 87 and excess pressure in the tank 82 is permitted to blow-off into the tank 81 by a safety valve 88. The water in the tanks 82 and 83 may be electrically heated in various ways and steam and hot water utilized as desired. As shown, the tank 82 contains an electric heating coil 85 and tank 83 contains electric heating plate electrodes 85.

I claim as my invention:

The combination of a metal hot water storage tank having an annular wall, and a plurality of transformers arranged in a circumferential row around said tank and each having a tubular secondary winding the ends of which communicate with the interior of the tank and are electrically connected therewith, a core which is surrounded on one of its parts by said tubular secondary, and a primary winding surrounding another part of said core.

Witness my hand this 13th day of May, 1912.

FRANK C. PERKINS.

Witnesses:
 LEWIS STOCKTON,
 THEO. L. POPP.